Oct. 7, 1958 W. ENDERS 2,855,565
METHOD FOR NON-DESTRUCTIVE EXAMINATION OF FERRO-MAGNETIC
WORKPIECES FOR NON-HOMOGENEOUS SPOTS
Filed Jan. 3, 1956
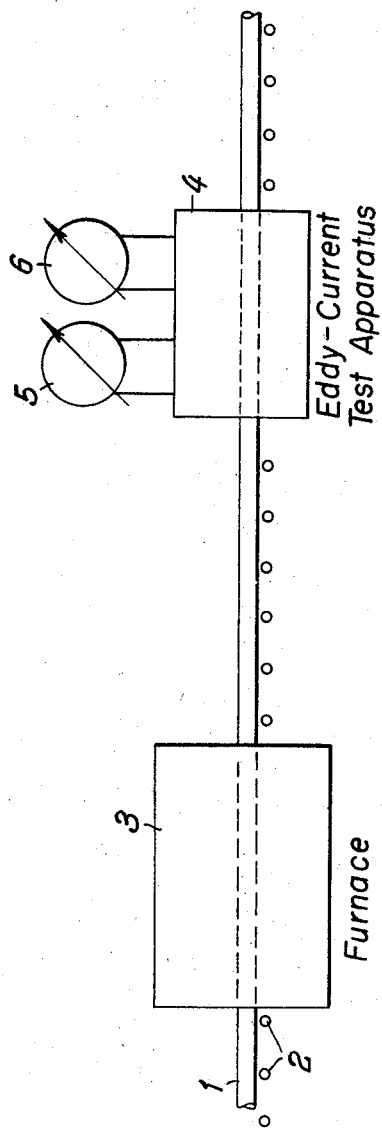
Inventor:
WALTER ENDERS
by his attorneys
Howson and Howson.

United States Patent Office 2,855,565
Patented Oct. 7, 1958

2,855,565

METHOD FOR NON-DESTRUCTIVE EXAMINATION OF FERRO-MAGNETIC WORKPIECES FOR NON-HOMOGENEOUS SPOTS

Walter Enders, Immiggrath, Germany

Application January 3, 1956, Serial No. 557,167

Claims priority, application Germany January 6, 1955

2 Claims. (Cl. 324—40)

This invention relates to a non-destructive examination of metallic workpieces for non-homogeneous spots, such as cracks, mechanical and bonding faults, cavities, slag insertions and the like by inducing eddy currents and measuring the electrical conductivity.

While perfect accuracy of measurement may be obtained without difficulty in the application of this kind of examination to workpieces of non-magnetic metals, difficulties are encountered in the examination of workpieces having ferro-magnetic properties because of falsifications of the result of measurement that may occur on account of magnetic effects. Thus for instance, small local deformations of the workpiece produced in cold state and causing changes in permeability may result in errors in indication just as large as would be caused by cracks or deviations in the composition of the material.

In order to utilize the eddy current method for the examination also of ferro-magnetic workpieces, it has been proposed to premagnetize the workpiece up to its true magnetic saturation. In this way, the result is obtained that the ferro-magnetic body to be examined responds to electro-magnetic influences like a non-magnetic body.

The same effect may be obtained in a simple manner according to the invention by heating the workpiece to be examined, before applying the eddy current method, at least to a temperature which is decisive for the disappearance of magnetizability. This temperature lies at 768° C. (Curie point) for iron. Compared to the premagnetization of the workpiece already proposed, a considerably smaller technical expenditure is required for the heat treatment. This measure is of particular importance for welded workpieces when the quality of the weld is to be examined, e. g. for seam welded tubes. These are often annealed for the purpose of normalizing the structure by heating the workpiece to approximately 800° C. It is possible to utilize this heating process without difficulties for performing the examination of the welded workpiece according to the invention by means of the eddy current method subsequently to the normalization annealing process.

The drawing shows by way of example a diagrammatic arrangement for performing the process.

The tube to be examined is designated by 1; it is passed on rolls 2 through the annealing furnace 3 and subsequently enters known test apparatus 4 having the measuring meters 5 and 6.

What I claim is:

1. The method for non-destructive examination of ferro-magnetic workpieces for non-homogeneous spots by inducing eddy currents and measuring the electrical conductivity comprising heating the workpiece at least to the Curie point, passing the workpiece while so heated through solenoid coils connected to a measuring instrument, and measuring any variation in eddy currents as said workpiece passes to determine the location of faults and non-homogeneity in the workpiece.

2. The method for non-destructive examination of ferro-magnetic seam welded tubes for non-homogeneous spots by inducing eddy currents and measuring the electrical conductivity, comprising annealing the tube at a temperature at least at the Curie point, passing the tube while still at a temperature of at least the Curie point through solenoid coils connected to a measuring instrument and measuring any variation in eddy currents as said workpiece passes to determine the location of faults and non-homogeneity in the workpiece.

References Cited in the file of this patent

UNITED STATES PATENTS

| | | |
|---|---|---|
| 1,321,347 | Wild et al. | Nov. 11, 1919 |
| 1,457,438 | Kelsall | June 5, 1923 |